Dec. 23, 1969     R. E. BURROUGH     3,485,364
CLASSIFICATION OF SOLID POLYMER PELLETS
Filed Feb. 9, 1967
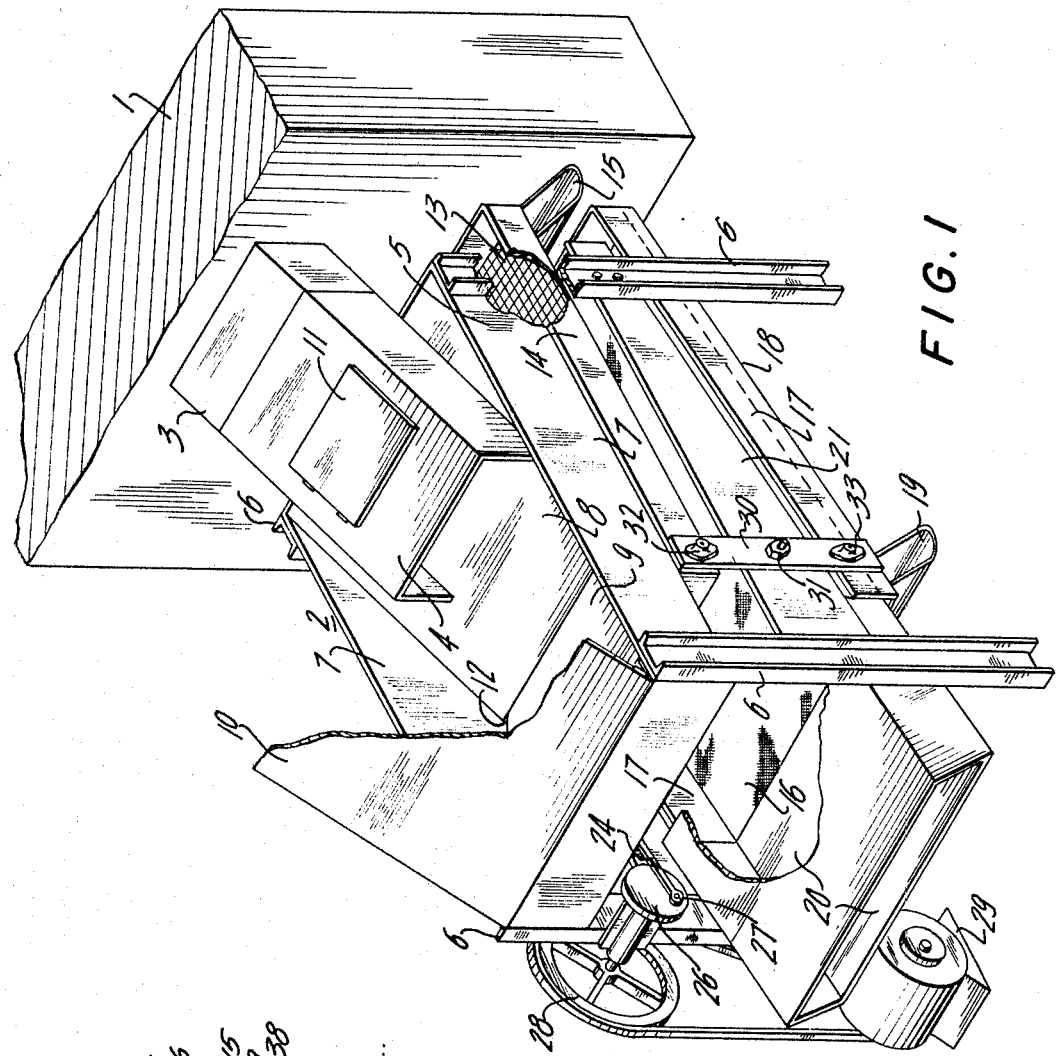
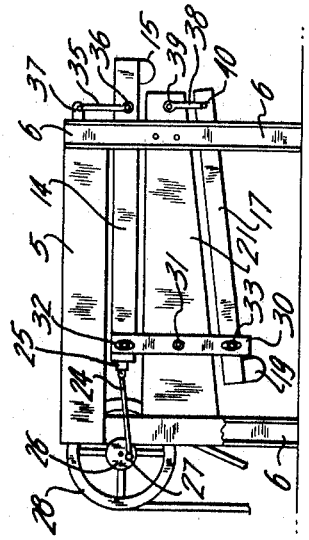
INVENTOR.
ROBERT E. BURROUGH
BY
ATTORNEY

United States Patent Office 3,485,364
Patented Dec. 23, 1969

3,485,364
CLASSIFICATION OF SOLID POLYMER PELLETS
Robert E. Burrough, West Springfield, Mass., assignor to Dart Industries Inc., Los Angeles, Calif., a corporation of Delaware
Filed Feb. 9, 1967, Ser. No. 614,947
Int. Cl. B07b 1/28
U.S. Cl. 209—245                                          4 Claims

ABSTRACT OF THE DISCLOSURE

An apparatus for classifying solid polymer pellets having a two pass reciprocating screen system and means for reducing the velocity of the pellets so they fall by gravity onto the screen system below.

BACKGROUND OF THE INVENTION

Field of the invention

This invention relates to an apparatus for classifying solid polymer pellets. More particularly, it relates to a combination of an apparatus for cutting extruded strands of polymeric material into solid pellets and an apparatus for classifying the pellets according to size.

Description of the prior art

Classifiers are available which screen polymer pellets according to size. However, the screening operation is inefficient and results in a great loss of polymer pellets when such classifiers are combined with pellet-cutting apparatus containing rotary cutters which impart high velocity and considerable centrifugal force to the pellets prior to their discharge into the classifiers (see U.S. Patents 2,524,751; 2,614,290 and 3,089,194). Elaborate pellet recovery systems are required when such pellet-cutters are used (see U.S. Patent 2,524,751).

Units are available which classify such materials as grain, coal, sand or other similar fragmentary materials which are either fed by hand or fall by gravity from feed bins into two-pass reciprocating screening systems (see U.S. Patents 40,340; 1,358,103 and 2,156,716). None of these prior art units was used for classifying polymeric material. More particularly, none of these units was combined with the type of pellet-cutters mentioned in the preceding paragraph. Therefore, none of the prior art units solved or was even concerned with the problem of classifying materials fed at high velocities into a screening system.

SUMMARY OF THE INVENTION

An object of this invention is to provide a simple, effective and efficient apparatus for classifying solid polymer pellets fed to the classifying apparatus at high velocities.

Another object of this invention is to provide a combination of a pellet-cutting apparatus and an apparatus for classifying the pellets discharged at high velocities from the pellet-cutting apparatus according to size without loss of pellets during the screening operation.

This invention is an improvement in an apparatus for classifying solid polymer pellets fed to it at high velocities, which comprises velocity reducing means for reducing the velocity of the pellets to about 0. The classifying apparatus has a frame, a plurality of reciprocating screens one above the other disposed within the frame, means operably connected to the screens for simultaneously reciprocating them in opposite directions, and means operably connecting the screens and the frame for maintaining a connection between the screens and the frame. The velocity reducing means of the present invention comprises a feed chute disposed in the upper portion of the frame having its axis inclined from the horizontal at an angle less than 90°, a hopper affixed to the frame and positioned adjacent the feed chute and above the uppermost reciprocating screen, and a cover plate attached to the hopper. The hopper has a pair of side walls and a pair of downwardly converging plates forming an opening at the position of their lowermost inclination through which the pellets propelled through the feed chute at high velocities fall by gravity to the reciprocating screens below. Preferably the axis of the feed chute is inclined from the horizontal at an angle between about 15° to 45°.

In a more particular embodiment of this invention, the hopper comprises, in addition to the pair of side walls, a feed plate having upper and lower edges and being contiguous with at least a portion of the feed chute, and an impact baffle plate having upper and lower edges. The lower edge of the impact baffle plate overlaps the lower edge of the feed plate and forms the boundaries of the opening with the lower edge of the feed plate. This overlapping prevents the pellets falling through the opening from regaining any of the momentum lost in the portion of the velocity reducing zone through which they have passed. More particularly, the invention provides in an apparatus having a frame, a plurality of reciprocating screens one above the other disposed within the frame, means operably connected to the screens for simultaneously reciprocating them in opposite directions, and means operably connecting the screens and the frame for maintaining connection between the screens and the frame, the improvement in the apparatus which comprises: (a) an enclosed feed chute disposed in the upper portion of the frame having its longitudinal axis inclined from the horizontal at an angle less than 90° and having an inlet opening for receiving solid polymer pellets and an outlet opening; (b) a hopper affixed to the frame and positioned adjacent to the feed chute and above the uppermost reciprocating screen having (i) a pair of side walls, and (ii) a pair of downwardly converging plates positioned between the side walls consisting of a feed plate having upper and lower edges, and being attached by its two sides to the side walls and inclined from the horizontal at substantially the same angle as the longitudinal axis of the feed chute, the upper edge of which is contiguous with the feed chute and the lower edge of which extends beyond the outlet opening of the feed chute and a static impact baffle plate having upper and lower edges, the lower edge of the impact baffle plate overlapping the lower edge of the feed plate by a finite distance and forming therewith an opening at the bottom of the lowermost inclination of the feed plate and the baffle plate; and (c) a cover attached to the hopper, whereby the solid polymer pellets propelled at velocities to the apparatus through the feed chute have their velocities substantially reduced and fall by gravity to the reciprocating screens below.

BRIEF DESCRIPTION OF THE DRAWINGS

The present invention will be more readily understood and further objects and advantages thereof will be more readily apparet when read in conjunction with the accompanying drawings in which:

FIG. 1 represents a perspective view of a preferred embodiment of the present invention including a combination of pellet-cutter 1 and classifier 2;

FIG. 2 represents a side elevation view of classifier 2 showing detail not shown in FIG. 1; and FIG. 3 depicts an internal detail of the velocity reducing means.

DESCRIPTION OF THE PREFERRED EMBODIMENT

In the preferred embodiment of this invention, a pellet-cutting apparatus comprising means for cutting extruded strands of polymeric material into solid pellets and means for discharging the solid pellets at velocities of at least 2,000 feet/min. is combined with an apparatus for classifying the pellets from the pelletizing apparatus into prime grade pellets, oversized pellets and undersized pellets. The classifying apparatus comprises a frame, a feed chute disposed in the upper portion of the frame and in communication with the pellet-cutting apparatus, a hopper affixed to the frame having a pair of side walls and a pair of downwardly converging plates including a feed plate and an impact baffle plate, a cover plate hingeably attached to the hopper at the upper edge of the impact baffle plate, a coarse mesh reciprocating screen disposed below the hopper, a fine mesh reciprocating screen disposed below the coarse mesh reciprocating screen, means for simultaneously reciprocating the screens in opposite directions and means for maintaining a connection between the screens and the frame. By means of this combination, the polymer pellets discharged at high velocities from the pellet-cutting apparatus have their velocities reduced to about 0 within the hopper and cover plate prior to falling by gravity onto reciprocating screens below.

Referring now to the drawings, pellet-cutter 1 comprises means (not shown) for admitting cooled strands of polymeric material from an extruder (not shown), means (not shown) for cutting the extruded strands into pellets ranging from less than about 3/64" to 1/2" or more under the influence of knives rotating at speeds of from about 1500 to 3500 r.p.m. and higher, and discharge spout 3. The cutting action of these knives imparts to the pellets linear velocities of at least 2,000 feet/min. The exact type of pellet cutter is not critical to the invention so long as these criteria are met. Many such units are commerically available. A complete description of one type of cutter that is suitable is found in U.S. Patent 3,089,194.

As shown in FIG. 1 of the drawings, one end of feed spout 4 is attached to discharge spout 3 through which the high velocity pellets are propelled from pellet-cutter 1 to classifier 2. Hopper 5 is positioned, as shown, in the upper portion of frame 6. Side walls 7 are secured to frame 6 and downwardly converging rectangular feed plate 8 and rectangular impact baffle plate 9 are secured to side walls 7 as shown. Feed plate 8 and impact baffle plate 9, are reversely inclined as shown in FIG. 3, from the horizontal at angles of about 24° and about 39°, respectively. Rectangular cover plate 10, which is shown partly broken away and in its opened position, is hingeably attached to hopper 5 at the upper edge of impact baffle plate 9. During the screening operation, cover plate 10 must be in its closed position with three of its edges in contact with the upper edges of side walls 7. Cover plate 10 covers the surface of impact baffle plate 9 and a small portion of feed plate 8. A portion of the surface of feed plate 8 is contiguous with a portion of feed spout 4. Removable panel 11 is provided in feed spout 4 for collecting samples and pellet inspection. As shown in FIG. 3, the lower edge of impact baffle plate 9 extends about 5/8" beyond the lower edge of feed plate 8 and forms opening 12 through which the pellets fall by gravity after ricocheting off impact baffle plate 9 and cover plate 10 onto coarse mesh reciprocating screen 13 below.

Coarse mesh reciprocating screen 13 is mounted within horizontal frame 14 below hopper 5. Oversized pellet spout 15 receives the polymer pellets having a particle size larger than the holes of screen 13 from which the oversized pellets are removed from the screening system. Fine mesh reciprocating screen 16 is mounted within inclined frame 17 and receives the pellets passing through screen 13. Pan 18 is mounted below screen 16 for collecting the undersized pellets or fines passing through screen 16. Undersized pellet spout 19 receives the fines collected in pan 18 from which they are removed from the screening system. Product spout 20, which is shown partly broken away, receives the prime grade pellets having the desired size which gravitate across fine mesh screen 16. A pair of side panels, side panel 21 the only one shown, are secured to frame 6 between horizontal frame 14 and inclined frame 17 to prevent loss of product.

FIG. 1 and FIG. 2 depict one suitable means for imparting reciprocating motion to the screens. One end of rocker arm 24 is operably connected to horizontal frame 14 by rocker arm coupling 25, as shown in FIG. 2, and the other end of rocker arm 24 is connected to eccentric 26 mounted on shaft 27 driven by pulley system 28 and motor 29. Dual rocker arms, couplings and eccentrics, can be used to impart smoother and more uniform reciprocating motion to the screens. Connecting member 30 is connected to side panel 21 between horizontal frame 14 and inclined frame 17. Connecting member 30 is journaled about fulcrum 31 on side panel 21 and is journaled about 32 and 33 on horizontal frame 14 and inclined frame 17, respectively. As shown in FIG. 2, one end of support rod 35 is journaled about 36 on horizontal frame 14 and the other end is journaled about 37 on frame 6 to maintain the connection between frame 6 and horizontal frame 14. Support member 38 is journaled about 39 on side panel 21 and is journaled about 40 on inclined frame 17 to provide support for inclined frame 17. Details of construction which are obvious to anyone skilled in the mechanical arts have been omitted from the description of the means for imparting reciprocating motion to the screens. It is obvious that alternatives can be used in such means, for example, each reciprocating screen can be provided with separate means for reciprocation.

The apparatus of the present invention is useful for classifying all types of thermoplastic pellets, including polyethylene, polypropylene, polymers of alpha-olefins having 4 to 8 carbon atoms such as butene-1, pentene-1, hexene-1, copolymers thereof and polystyrene. For example, polystyrene pellets were propelled from pellet-cutter 1 at a linear velocity of at least 2700 feet/min. into classifier 2 where the pellets were classified into oversized pellets having a particle size of greater than 1/8", fines having a particle size of less than 14 mesh and the prime grade product having a uniform size of approximately 1/16" by 1/8". The classifying apparatus used in this example is a compact unit which classified the polystyrene pellets into three grades of pellets in a simple and efficient manner without loss of product.

While particular embodiments of this invention are shown above, it will be understood that the apparatus of this invention is obviously subject to variations and modifications without departure from its broader aspects.

What is claimed is:
1. In an apparatus having:
   (1) a frame,
   (2) a plurality of reciprocating screens one above the other disposed within the frame,
   (3) means operably connected to said screens for simultaneously reciprocating them in opposite directions, and
   (4) means operably connecting said screens and said frame for maintaining connection between said screens and said frame, the improvement in said apparatus which comprises:
      (a) an enclosed feed chute disposed in the upper portion of said frame having its longitudinal axis inclined from the horizontal at an angle less than 90° and having an inlet opening for receiving solid polymer pellets and an outlet opening,
      (b) a hopper affixed to said frame and positioned adjacent to said feed chute and above the uppermost reciprocating screen having
         (i) a pair of side walls and
         (ii) a pair of downwardly converging plates positioned between said side walls consisting of
            (I) a feed plate having upper and lower edges and being attached by its two sides to said side walls and inclined from the horizontal at substantially the same angle as the longitudinal axis of said feed chute, the upper edge of which is contiguous with said feed chute and the lower edge of which extends beyond the outlet opening of said feed chute, (II) a static impact baffle plate having upper and lower edges, the lower edge of said impact baffle plate overlapping the lower edge of said feed plate by a finite distance and forming therewith an opening at the bottom of the lowermost inclination of said feed plate and said baffle plate; and (c) a cover plate attached to said hopper, whereby the solid polymer pellets propelled at high velocities to said apparatus through said feed chute have their velocities substantially reduced and fall by gravity to the reciprocating screens below.

2. The apparatus of claim 1 wherein the horizontal axis of said feed chute is inclined from the horizontal at an angle between about 15° and 45°.

3. The apparatus of claim 1 wherein said reciprocating screens comprise a coarse mesh screen and a fine mesh screen disposed below said coarse mesh screen.

4. The apparatus having:
(1) a frame,
(2) an enclosed feed chute disposed in the upper portion in said frame having its longitudinal axis inclined from the horizontal at an angle between about 15° and 45° and having an inlet opening for receiving solid polymer pellets and an outlet opening,
(3) a hopper affixed to said frame having:
(a) a pair of side walls and
(b) a pair of downwardly converging plates positioned between said side walls consisting of
(i) a feed plate having upper and lower edges and being attached by its two sides to said side walls and inclined from the horizontal at substantially the same angle as the longitudinal axis of said feed chute, the upper edge of which is contiguous with said feed chute and the lower edge of which extends beyond the outlet opening of said feed chute,
(ii) a static impact baffle plate having upper and lower edges, the lower edge of said impact baffle plate overlapping the lower edge of said feed plate by a finite distance and forming therewith an opening at the bottom of the lowermost inclination of said feed plate and said baffle plate through which the polymer pellets fall by gravity,
(4) a cover plate hingeably attached to the hopper at the upper edge of said impact baffle plate covering at least the surface of said impact baffle plate,
(5) a coarse mesh reciprocating screen disposed below said hopper,
(6) a fine mesh reciprocating screen disposed below said coarse mesh reciprocating screen,
(7) means operably connected to said screens for simultaneously reciprocating them in opposite directions, and
(8) means operably connecting said screens and said frame for maintaining a connection between said screens and said frame, whereby said polymer pellets propelled at high velocities through said feed chute have their velocities reduced within said hopper and cover plate prior to falling by gravity onto the reciprocating screens below.

References Cited

UNITED STATES PATENTS

| | | | |
|---|---|---|---|
| 695,250 | 3/1902 | Brake | 209—344 X |
| 1,031,504 | 7/1912 | Anderson | 209—344 X |
| 1,162,123 | 11/1915 | Yandle | 209—344 X |
| 3,089,194 | 5/1963 | Goins | 264—143 |
| 3,269,532 | 8/1966 | Moore | 209—247 X |

FOREIGN PATENTS 833,623   7/1938   France.

FRANK W. LUTTER, Primary Examiner

U.S. Cl. X.R.

209—247, 315, 344